Oct. 27, 1970 G. GUANELLA 3,536,833

PROCESS FOR CONCEALING COMMUNICATIONS SIGNALS

Filed July 8, 1965

INVENTOR

Gustav Guanella

BY Pierce, Scheffler & Parker

ATTORNEYS

United States Patent Office 3,536,833
Patented Oct. 27, 1970

3,536,833

PROCESS FOR CONCEALING COMMUNICATIONS SIGNALS

Gustav Guanella, Zurich, Switzerland, assignor to Patelhold Patentverwertungs- & Elektro-Holding AG., Glarus, Switzerland Filed July 8, 1965, Ser. No. 470,387
Claims priority, application Switzerland, July 31, 1964, 10,036/64
Int. Cl. H04l 9/02; H04m 1/70
U.S. Cl. 178—22 4 Claims

ABSTRACT OF THE DISCLOSURE

A process for concealing the communication content of a pulse-coded clear-language signal sent between transmitting and receiving stations wherein the clear-language signal is combined with a first additional signal of the same pulse code as the clear-language signal to produce an algebraic sum thereof while suppressing in the summed signal any carry-over which may be from the figure corresponding to the highest figure of the clear-language and additional signals to the next higher figure. The summed signal is sent to the receiving station where a pulse corresponding to the said next higher figure is added to it, and a second additional signal identical with the first additional signal is then subtracted thereby to reconstitute the clear-language signal.

Figure 1:
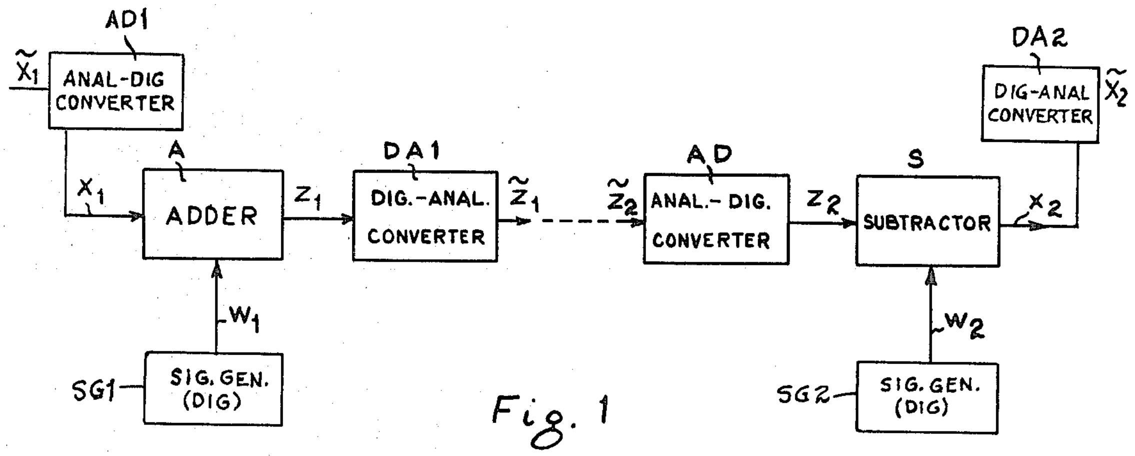

The present invention relates to a process for concealing the communication content of pulse-coded clear-language signals.

There is a known process for keeping speech secret wherein the amplitude sequence of the speech to be transmitted, after preliminary quantification, is converted into pulse-code combinations in accordance with an invariable rule. The sequence of pulse-code combinations obtained in this manner is thereupon combined in the sense of sign-multiplication with a separately generated and, as far as possible, irregular sequence of pulse-code combinations. The ciphered sequence of pulse-code combinations thus generated, having been transmitted, is again combined in the receiver, in the sense of sign-multiplication, with a sequence of pulse-code combinations identical with the sequence used at the transmitter, so that the original sequence of pulse-code combinations is retrieved.

If the ciphered sequence is not transmitted directly from the transmitter to the receiver, being replaced by corresponding analogue signals, for example, amplitude-modulated pulses, which is of advantage in making the band width required to be transmitted as small as possible, it is found that amplitude-variations during transmission using the known process involve the disadvantage of intolerably severe interference with the clear-language signal. This will be shown hereinafter with reference to a simple example.

It will be assumed that the sequence of pulse-code combinations consists of binary-coded five-figure signals. The pulse-code combination of the clear-language signal is designated by $x_1$, and $w_1$ designates any pulse-code combination which is combined with $x_1$ in the sense of sign-multiplication to give the resultant combination $z_1$, which latter is transmitted after conversion into a corresponding analogue signal. A logical "or" circuit is, for example, used for the purpose of combination in the sense of sign-multiplication, and delivers a pulse (L) each time one of the two pulse-code combinations introduced comprises a pulse in the relevant figure position, and the said circuit does not deliver a pulse (O) if both pulse-code combinations comprise a pulse or do not comprise a pulse (LL or OO). Correspondingly at the receiving end $z_2$ is the ciphered pulse-code combination present after conversion of the analogue received signal, $w_2$ is any pulse-code combination which is identical with $w_1$ and which is combined with $z_2$ in the sense of sign-multiplication, and $x_2$ is the pulse-code combination of the clear-language signal, which ought naturally to be the same as $x_1$.

$$x_1 = OLLOL$$
$$\underline{w_1 = LLOLL}$$
$$z_1 = LOLLO$$

$$z_2 = LOLLO$$
$$\underline{w_2 = w_1 = LLOLL}$$
$$x_2 = OLLOL = x_1$$

If it is now assumed that the amplitude of the analogue transmitted signal is slightly altered while it is being transmitted in consequence of interference, non-linearity or the like, the pulse-code combination of the received signal is naturally also slightly different from that of the transmitted signal. The pulse-code combination $z_2'$ of the ciphered received signal is thus not the same as the pulse-code combination $z_1$ of the ciphered transmitted signal, but is greater, for example, by a small pulse-code combination $s$, i.e. $z_2' = z_1 + s$ by algebraic addition. Combining the pulse-code combination $z_2'$ in the sense of sign-multiplication with the pulse-code combination $w_2 = w_1$ again yields the pulse-code combination of the clear-language signal, which will be designated by $x_2'$. Accordingly:

$$z_1 = LOLLO$$
$$\underline{s = OOOLL}$$
$$z_2' = z_1 + s = LLOOL$$
$$\underline{w_2 = w_1 = LLOLL}$$
$$x_2' = OOOLO$$

This received clear-language signal $x_2'$ is no longer identical with the clear-language signal $x_1$ to be transmitted, but is substantially smaller. The departure from the required value works out in accordance with the absolute value to $x_2' - x_1 = OOOLO - OLLOL = OLOLL$, and represents a considerable quantity.

A further known process for concealing the communication content of an amplitude-modulated pulse-train resides in adding a signal to the communication signal at the transmitting end, and subtracting the said additional signal from the said communication signal at the receiving end. In this process, the pulse-train modulated by the sum signal passes at the transmitting end through a circuit arrangement whereof the intrinsically linear transmission characteristic is converted into a saw-tooth shaped characteristic by admixing constant quantities in dependence on the amplitudes of the pulses, so that at least two portions of the characteristic rising in linear fashion between constant extreme values occur in the region between the amplitude values which occur. In this connection, corresponding means are used at the receiving end to recover the communication signal.

If the communication signal and the additional signal are present in digital form, for example, in a binary code, the binary-coded signals must first of all be converted into analogue form with the aid of digital-analogue converters in order that this known process may be used. Corresponding means are also required at the receiving end, so that much additional expenditure is involved. In addition, this known process exhibits the disadvantage that the saw-tooth-shaped transmission characteristic is subject to various influences, such as variations in temperature and operating voltage, and ageing. Since departures from the transmission characteristic have a detrimental effect, the characteristic must be continuously monitored and if required automatically corrected.

The disadvantages of known processes are avoided by the present invention. The invention likewise relates to a process for concealing the communication content of pulse-coded clear-language signals by mixing with a likewise pulse-coded additional signal having the same number of pulses, and is characterized in that the clear-language signal and the additional signal are algebraically added at the transmitting end, any carry-over which there may be from the figure corresponding to the highest figure of the clear-language and additional signals to the next-higher figure being suppressed in the sum signal, and in that corresponding means are used in intrinsically known manner at the receiving end to recover the clear-language signal.

Figure 2:
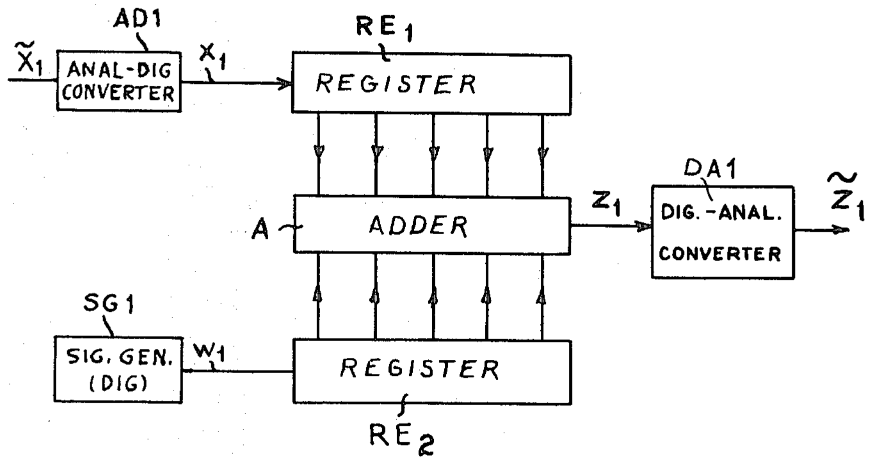

The process will be more precisely explained with reference to the attached drawings wherein:

FIG. 1 is a circuit arrangement shown in block schematic form and which is illustrative of one embodiment for carrying out the improved process; and FIG. 2 is a sub-circuit diagram illustrating a modification for a part of the overall circuit shown in FIG. 1.

With reference now to FIG. 1, the pulse-coded clear-language signal, which may more particularly be binary-coded, is designated by $x_1$. In this connection, it is possible to convert an analogue clear-language signal into the pulse-coded signal by means of an analogue-digital converter AD1. However, the clear-language signal is often already present in digital form, for example, in the case of measured values. The likewise pulse-coded, more particularly binary-coded, additional signal is furthermore designated in FIG. 1 by $w_1$, and has the same number of figures as the pulse-coded clear-language signal. It is expedient to generate by means of digital signal generator SG1 such additional signals having their values distributed as uniformly as possible.

Both signals are fed to the adder A, which is a binary adder in the case of binary-coded signals. Clear-language signals $x_1$ and additional signals $w_1$ are added algebraically in the adder A, and any carry-over which there may be from the figure corresponding to the highest figure of the clear-language and additional signals to the next-higher figure is suppressed. The pulse-coded sum signal $z_1$ accordingly has the same number of figures as the clear-language signal $x_1$ and the additional signal $w_1$.

The sum signal $z_1$ may then be fed directly to the transmitter. However, it is more advantageous, in order to economize in bandwidth in the transmission channel, to convert the pulse-coded sum signal $z_1$ into a corresponding analogue transmission signal $\tilde{z}_1$ by means of a digital-analogue converter DA1, and to feed this analogue signal to the transmitter.

At the receiving end, corresponding means are used in an intrinsically known manner to recover the clear-language sgnal. Thus, if the concealed signal has been transmitted in analogue form, the received signal, designated in FIG. 1 by $\tilde{z}_2$, is first of all fed to an analogue-digital converter AD2. The converted received signal $z_2$, now present in digital form, or merely the received signal if transmission has taken place in digital form, passes to a subtractor circuit S, by means of which the pulse-coded additional signal $w_2$ generated by digital signal generator SG2 is subtracted from the concealed signal $z_2$. In this connection, it is presupposed that $w_2$ is identical with the additional signal $w_1$ used at the transmitting end, and occurs at the same time as the signal $z_2$ mixed with the additional signal $w_1$. The received signal $x_2$ at the output of the subtractor circuit S then passes to a digital-analogue converter DA2 where it is converted into the same form as presented to the input of the transmission point, i.e. to converter AD1. Should subtraction lead to a negative value, an additional pulse is added to correspond to suppression of the carry-over.

The process described will be explained with reference to the example of a five-figure binary-coded clear-language signal, the following being encountered at the transmitting end $$x_1=OLLOL$$
$$w_1=LLOLL$$
$$z_1=x_1+w_1=(L)OLOOO$$

the carry-over (L) in brackets being suppressed.

The following mixing appears in corresponding fashion at the receiving end:

$$z_2=z_1=(L)OLOOO$$
$$w_2=w_1=\ \ LLOLL$$
$$x_2=z_2-w_2=OLLOL=x_1$$

The pulse (L) in brackets posted for the signal has been added here in order that subtraction may be carried out.

It now becomes apparent that any variation in amplitude of the coded signal which occurs while the latter is being transmitted in analogue form results in an error in the clear-language signal not greater than the amplitude-variation. For example, let the concealed transmitted signal be increased at the receiving end by a small signal $s$ due to non-linearity in the transmission path, i.e.

$$z_1=OLOOO$$
$$s=OOOLL$$
$$z'_2=z_1-s=OLOLL$$

The additional signal $w_2$ is subtracted from this at the receiving end:

$$z'_2=(L)OLOLL$$
$$w_2=w_1=\ \ LLOLL$$
$$x'_2=z'_2-w_2=LOOOO$$

The departure of the received clear-language signal $x_2'$ from the clear-language signal $x_1$ to be transmitted is given in accordance with the absolute value by $$x_2'-x_1=LOOOO-OLLOL=OOOLL$$

i.e. equal to the small signal $s$ by which the amplitude of the transmitted signal was varied. It is according impossible, in the process according to the invention, for the clear-language signal to be completely upset by interference, as oppossed to one of the known processes.

Circuit arrangements for algebraically adding pulse-coded signals, more particularly binary-coded signals, at the transmitting end are known. Binary-coded signals are advantageously subtracted in known manner at the receiving end by leaving the additional signal $w_2$, i.e. the subtrahend, unaltered from the lowest figure up to the first "L" inclusive, inverting the remaining higher figures, and adding the additional signal thus converted to the concealed received signal $z_2$, any carry-over which there may be from the highest figure being suppressed. Using a known binary adder, the circuit arrangement for recovering the clear-language signal at the receiving end is accordingly advantageously so designed that the additional signal up to the first "L" inclusive enters the adder unaltered, and subsequently in inverse fashion.

In order to facilitate addition, it is advantageous to store the clear-language and additional signals each in a register before addition. In FIG. 2, $RE_1$ designates a register in which the pulse-coded clear-language signals $x_1$ are stored. The pulse-coded additional signals $w_1$ are stored in a second register $RE_2$. Both stores are linked to the adder A.

It is readily possible to supplement the process by further intrinsically known measures in order to increase the degree of secrecy. Thus, for example, in order to guarantee secrecy during periods in which no clear-language signal to be concealed is present, the clear-language signal may be mixed at the transmitting end by an uninterrupted cover signal which is removed again at the receiving end.

I claim:

1. The process for concealing the communication content of pulse-coded clear-language signals sent between a transmitting station and a receiving station which comprises the steps of:

(a) combining said pulse-coded clear-language signal at the transmitting station with a first additional pulse-coded signal of the same pulse coding as that of the clear-language signal in such manner as to produce an algebraic sum thereof, while suppressing in the summed signal any carry-over which may be from the figure corresponding to the highest figure of said clear-language and additional signals to the next higher figure, (b) transmitting said combined signal from said transmitting station to said receiving station, and (c) adding to the combined signal the pulse corresponding to said next higher figure and subtracting therefrom, at said receiving station, a second additional signal identical with said first additional signal thereby to reconstitute said clear-language signal.

2. The process for concealing the communication content of a pulse-coded clear language signal as defined in claim 1 wherein said clear-language signal and said first and second additional signals are binary coded.

3. The process for concealing the communication content of a pulse-coded clear-language signal as defined in claim 1 and which includes the further steps of converting said pulse-coded sum signal into an analogue signal at said transmitting station and reconverting the transmitted analogue signal into a pules-coded sum signal at said receiving station.

4. The process for concealing the communication content of a pulse-coded clear-language signal as defined in claim 1 and which includes the further steps of storing said pulse-coded clear language signal and also said first additional pulse-coded signal prior to adding the two signals algebraically.

References Cited

UNITED STATES PATENTS

| | | | |
|---|---|---|---|
| 2,777,897 | 1/1957 | Gretener et al. | 325—32 X |
| 3,071,649 | 1/1963 | Goodall | 179—1.5 |
| 3,077,518 | 2/1963 | Guanella | 179—1.5 |
| 3,243,507 | 3/1966 | Macouski | 179—15.55 |

RODNEY D. BENNETT, Primary Examiner

D. C. KAUFMAN, Assistant Examiner

U.S. Cl. X.R.

179—1.5